United States Patent
Busch et al.

(10) Patent No.: US 7,048,668 B2
(45) Date of Patent: *May 23, 2006

(54) POSITION COMPENSATING DIFFERENTIAL LOCKING MECHANISM

(75) Inventors: Charles R. Busch, Fredericktown, OH (US); Howard Reaser, Howard, OH (US)

(73) Assignee: Dana Corporation, Toledo, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/989,868

(22) Filed: Nov. 16, 2004

(65) Prior Publication Data

US 2005/0090357 A1   Apr. 28, 2005

Related U.S. Application Data

(63) Continuation of application No. 10/316,411, filed on Dec. 11, 2002, now Pat. No. 6,835,155.

(51) Int. Cl.
*F16H 48/24* (2006.01)

(52) U.S. Cl. .................. 475/231; 475/150; 475/237; 475/241

(58) Field of Classification Search ................ 475/150, 475/231, 237, 240, 241
See application file for complete search history.

(56) References Cited

U.S. PATENT DOCUMENTS

| 968,224 | A | 8/1910 | Wolf |
|---|---|---|---|
| 1,338,720 | A | 5/1920 | Darr |
| 1,511,908 | A | 10/1924 | Pickering |
| 3,202,016 | A | 8/1965 | Arnold |
| 3,215,000 | A | 11/1965 | Senkowski et al. |
| 4,263,824 | A | 4/1981 | Mueller |
| 4,715,248 | A | 12/1987 | Gant |
| 5,171,192 | A | 12/1992 | Schlosser et al. |
| 5,350,340 | A | 9/1994 | Paul et al. |
| 6,835,155 | B1 * | 12/2004 | Busch et al. ............. 475/231 |

* cited by examiner

*Primary Examiner*—Richard M. Lorence
(74) *Attorney, Agent, or Firm*—Dykema Gossett PLLC

(57) ABSTRACT

A differential with an improved locking mechanism is provided. The differential includes first and second clutch members in the form of a differential case having a first set of teeth and a an axle shaft mounted clutch collar having a second set of teeth. A yoke urges the clutch into an out of engagement and is supported on a pivot shaft. The yoke is selectively urged in one direction by an actuator acting on a lever on the pivot shaft. The lever is coupled to the yoke by a spring. The yoke is urged in an opposite direction by one or more return springs mounted on the same pivot shaft. The compact nature of the locking mechanism and the balance of forces provided by the springs and actuator provide an inexpensive and reliable locking mechanism.

9 Claims, 2 Drawing Sheets

POSITION COMPENSATING DIFFERENTIAL LOCKING MECHANISM

This application is a continuation of U.S. application Ser. No. 10/316,411 filed Dec. 11, 2002, now U.S. Pat. No. 6,835,155, the entire disclosure of which is incorporated herein by reference.

BACKGROUND OF THE INVENTION

1. Field of the Invention

The present invention relates to a differential, and more particularly, to a position compensating differential locking mechanism.

2. Discussion of Related Art

Differential gear mechanisms, simply referred to as differentials, are well known devices frequently used in the drive trains of most vehicles. The differential is usually connected between an input driving shaft (typically a drive shaft from the vehicle engine) and a pair of output driven shafts (typically a pair of axle shafts connected to the vehicle wheels). The differential distributes torque from the input shaft equally to the two output shafts, while permitting such output shafts to rotate at different speeds under certain conditions. As a result, torque is supplied to both wheels of the vehicle as it negotiates a turn, while permitting the outside wheel to turn faster than the inside wheel.

In a conventional open differential, the movements of the various internal components of the differential are not restricted in any significant fashion. Thus, the differential functions in the desirable manner described above under most circumstances. However, when one of the wheels loses traction with the ground, due to, for example, wet or icy surfaces, the differential will reduce the amount of torque supplied to the other wheel. Consequently, the vehicle can become immobilized.

To prevent immobilization, some differentials are provided with a locking mechanism. When actuated, the locking mechanism restricts the movement of some of the differential's internal components. This restriction allows the drive shaft to provide torque to both wheels instead of providing torque only to the wheel with less traction. Some differential locks remain locked and automatically unlock while turning corners. Other differentials use a driver-initiated control to manually engage and disengage the lock at the driver's command.

One conventional differential locking mechanism includes a first set of teeth on a differential case of the differential and a clutch collar having a second set of teeth configured to selectively engage the first set of teeth. The clutch collar is supported on a drive axle shaft extending through the differential case. The mechanism further includes a yoke supported on a pivot shaft and received within a groove in the clutch collar. A lever is also supported on the pivot shaft and is disposed outside of the differential housing where it may be coupled to a spring-loaded cable system manually operated by the vehicle operator. This conventional differential has several disadvantages. First, the locking mechanism can only be engaged while the vehicle is at rest. Second, the manual engagement of the locking mechanism requires a physical effort on the part of the operator. Third, the locking mechanism requires a relatively large amount of space to link the lever and the cable system.

The inventors herein have recognized a need for a differential that will minimize and/or eliminate one or more of the above-identified deficiencies.

SUMMARY OF THE INVENTION

The present invention provides a differential with a position compensating differential locking mechanism.

A differential in accordance with one embodiment of the present invention includes a differential case having a first set of teeth and defining a central bore. A drive axle shaft is disposed within the central bore and is rotatable therein. The differential also includes a clutch collar mounted on the drive axle shaft. The clutch collar has a second set of teeth configured to selectively engage the first set of teeth and to prevent relative rotation between the drive axle shaft and the differential case. The clutch collar further defines a groove. A yoke is supported on a pivot shaft and is received within the groove in the clutch collar. The differential further includes a lever supported on the pivot shaft and a first spring disposed between the yoke and the lever. An actuator selectively urges the lever and the yoke in a first rotational direction to a first position. A second spring urges the lever and the yoke in a second rotational direction to a second position. The first and second sets of teeth are urged into engagement in one of the first and the second positions and the first and the second sets of teeth are urged to disengage in another of the first and the second positions.

A differential in accordance with the present invention has one or more advantages as compared to the prior art. First, the differential can operate freely during vehicle travel regardless of the level of engagement between the opposed clutch members. Second, the inventive differential may eliminate the need for manual operation of the differential locking mechanism. Third, the locking mechanism of the inventive differential is compact thereby conserving vehicle space.

This and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
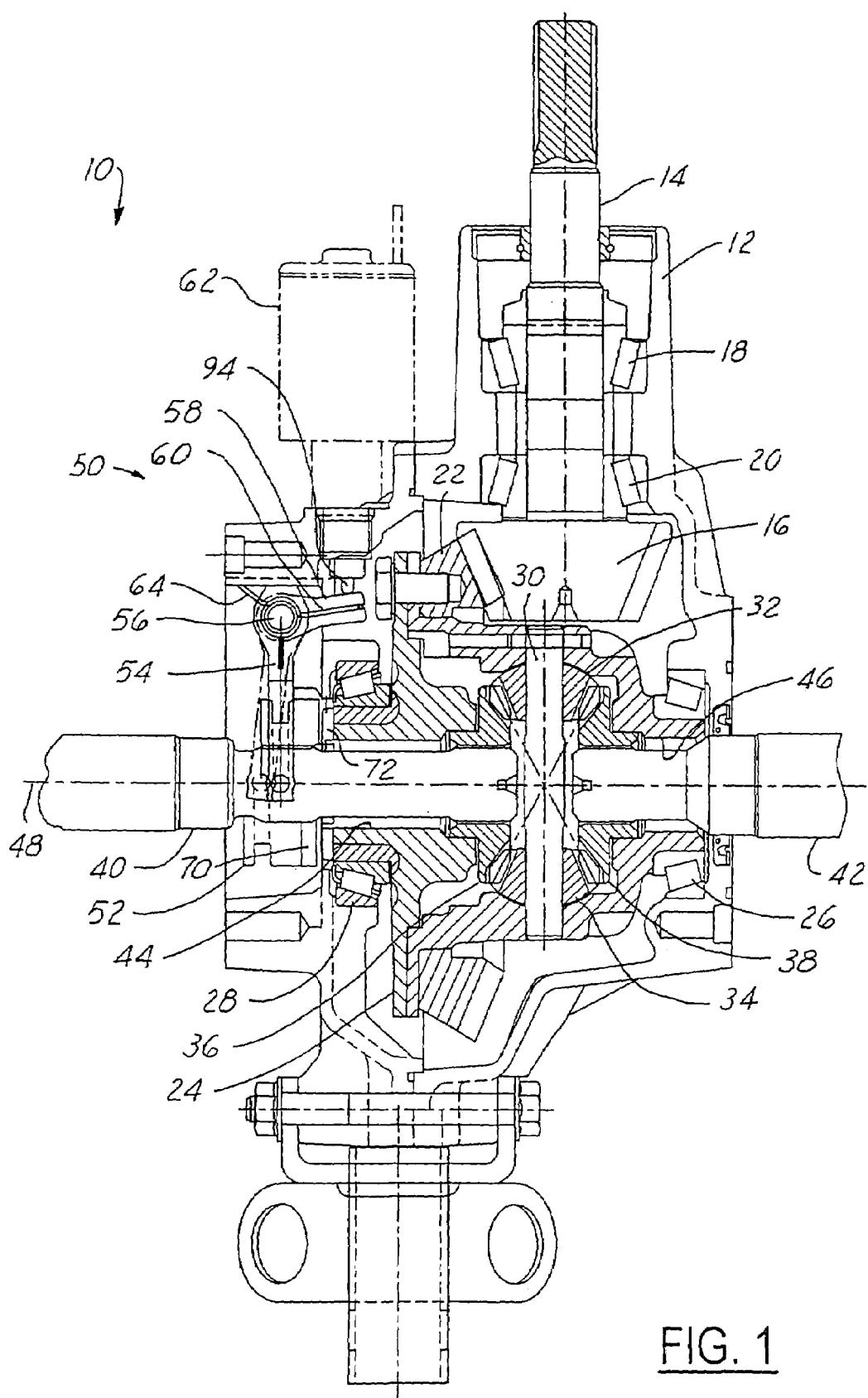
FIG. 1 is a cross-sectional view of a differential in accordance with one embodiment of the present invention.

Referring now to the drawings wherein like reference numerals are used to identify identical components in the various views, FIG. 1 illustrates a cross-sectional view of a differential 10 in accordance with one embodiment of the present invention. Differential 10 is provided to enable two wheels (not shown) in a vehicle that are disposed about a common rotational axis to rotate at different speeds. Differential 10 may include several conventional components known to those of skill in the art. In particular, differential 10 may include a housing 12 composed of multiple members and a pinion shaft 14 that extends through an opening in housing 12 and supports a pinion gear 16. The pinion shaft 14 may be supported for rotation within housing 12 by bearings 18, 20 and may be driven by a power input shaft (not shown). Differential 10 may further include a ring gear 22 coupled to or integral with a differential case 24 and driven by pinion gear 16. Case 24 is supported within housing 12 by bearings 26, 28 and may house a spider 30 on which one or more differential gears 32, 34 are mounted.

Gears 32, 34 mesh with side gears 36, 38 splined to drive axle shafts 40, 42 that are disposed in central bores 44, 46, respectively, defined in case 24. Shafts 40, 42 are rotatable within bores 44, 46 about an axis 48. In accordance with the present invention, differential 10 may also include a differential locking mechanism 50.

Figure 2:
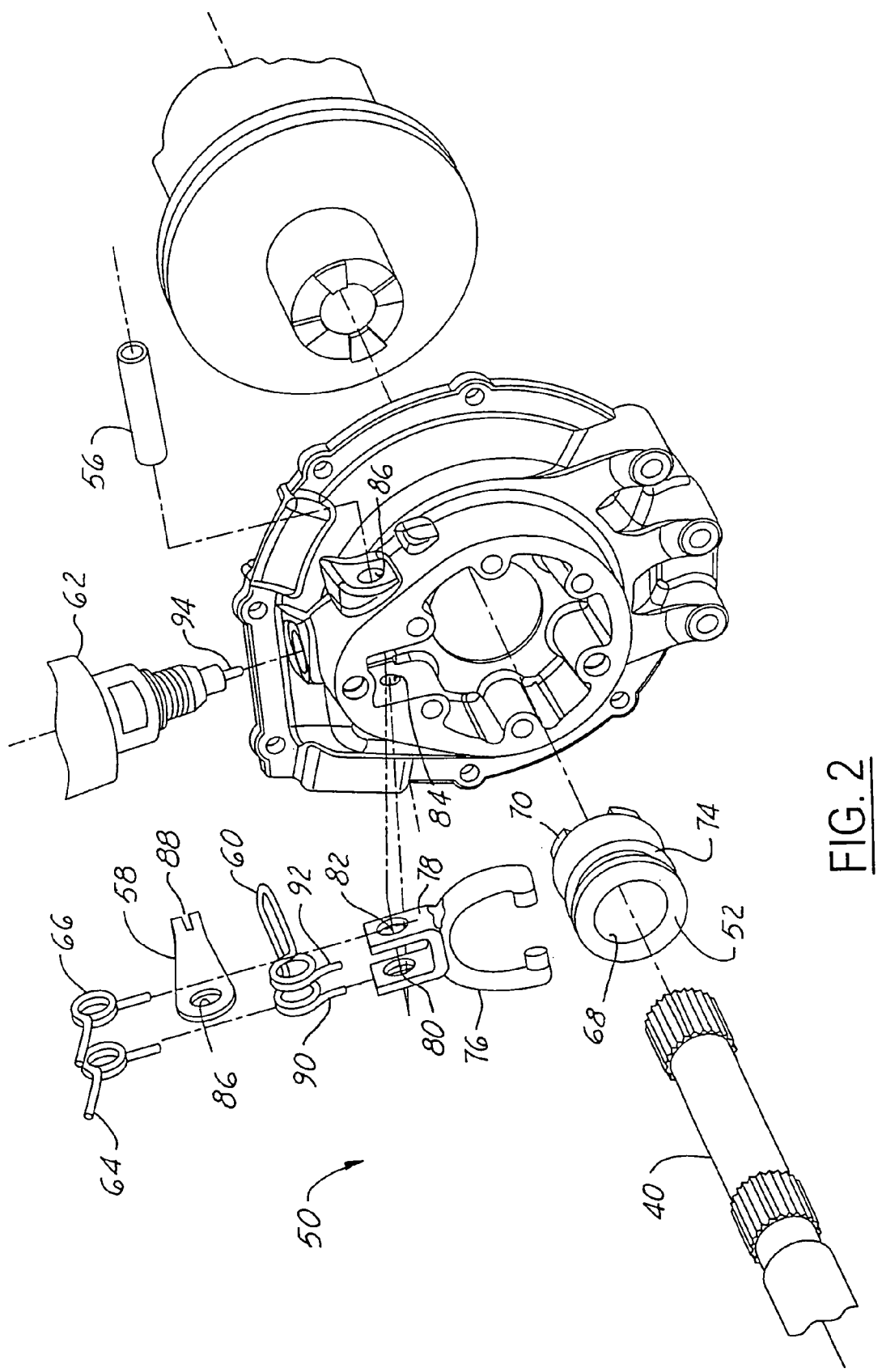
FIG. 2 is an exploded view of a portion of the differential of FIG. 1.

Referring to FIGS. 1 and 2, mechanism 50 is provided to selectively lock and unlock differential 10 to prevent relative rotation between shafts 40, 42. Mechanism 50 may include a clutch collar 52, a yoke 54, a pivot shaft 56, a lever 58, an actuator spring 60, an actuator 62, and one or more return springs 64, 66.

Clutch collar 52 comprises one member of a clutch used to lock differential 10 and thereby prevent relative rotation between shaft 40 and case 24. Collar 52 defines a bore 68 configured to receive shaft 40. Collar 52 is mounted on shaft 40 and is axially movable on shaft 40 through, for example, splines disposed on a radially outer surface of shaft 24 and a radially inner surface of collar 52. Collar 52 may include a set of teeth 70 at one axial end of collar 52 configured to selectively engage another set of teeth 72 on one axial end of case 24. Teeth 70 on collar 52 may be machined with a negative one-degree draft to aid in retaining engagement between teeth 70, 72 during rotation. Collar 52 also defines a peripheral, circumferentially extending groove 74 proximate another axial end of collar 52.

Yoke 54 is provided to move collar 52 axially inboard and outboard and to thereby move teeth 70 on collar 52 into and out of engagement with teeth 72 on case 24. Referring to FIG. 2, yoke 54 includes a substantially U-shaped member 76 configured to be received within groove 74 of collar 52. Yoke 54 may further include a substantially U-shaped bracket 78 coupled to member 76 through welds or other conventional fasteners. Bracket 78 opens in an opposite direction as compared to member 76 and includes aligned apertures 80, 82 proximate each end enabling yoke 54 to be supported on pivot shaft 56.

Pivot shaft 56 enables pivoting motion of yoke 54 and lever 58. Shaft 56 is supported at either longitudinal end within one or more bores 84, 86 in housing 12 as shown in FIG. 2. Bushings (not shown) may be interposed between the inner surface of housing 12 defining bores 84, 86 and shaft 56. Shaft 56 extends through apertures 80, 82 in bracket 78 of yoke 54.

Lever 58 is provided for use in causing rotation of yoke 54 about pivot shaft 56. Lever 58 includes an aperture 86 through which shaft 56 extends to support lever 58. Lever 58 is free to rotate about shaft 56 and is disposed between the opposed ends of bracket 78. Lever 58 further defines a groove 88 configured to receive a portion of spring 60.

Spring 60 couples yoke 54 and lever 58 and is disposed between yoke 54 and lever 58. Spring 60 may comprise a double coil spring wherein the coils are sized to receive pivot shaft 56. Spring 60 includes two tangs 90, 92 that are coupled to yoke 54 and spring 60 is received within the opposed ends of bracket 78.

Actuator 62 is provided to selectively urge lever 58 and yoke 54 in one rotational direction (clockwise in the illustrated embodiment) to one of two positions. In the illustrated embodiment, yoke 54 is moved to a position that results in disengagement of teeth 70, 72 from one another. It should be understood, however, that actuator 62 could alternatively urge yoke 54 in the opposite rotational direction to another position that results in engagement of teeth 70, 72. In a preferred embodiment of the invention, actuator 62 comprises an electronic actuator and, in particular, a push-type solenoid.

It should be understood, however, that actuator 62 may take on a variety of forms including, for example, a magnetic latch type solenoid. Actuator 62 includes a plunger 94 that is selectively urged outwardly from actuator 62 to engage lever 58 and cause rotation of yoke 54.

Return springs 64, 66 are provided to urge yoke 54 in another rotational direction (counterclockwise in the illustrated embodiment), opposite to the rotational direction urged by actuator 62, and to another position. In the illustrated embodiment, this position results in engagement of teeth 70, 72. It again should be understood, however, that return springs 64, 66 could alternatively urge yoke 54 in the opposite direction to a position resulting in disengagement of teeth 70, 72. Return springs 64, 66 include a coil sized to receive pivot shaft 56 and are located on pivot shaft 56 on either side of bracket 78 of yoke 54. Springs 64, 66 are coupled to yoke 54 at one end and at housing 12 at another end. Although two return springs 64, 66 are shown in the illustrated embodiment, it should be understood that varying numbers of springs could be used without departing from the spirit of the present invention.

Referring again to FIGS. 1 and 2, in the illustrated embodiment return springs 64, 66 normally urge yoke 54 in a first rotational direction causing axial movement of collar 52 in an inboard direction towards case 24 and engagement of teeth 70, 72. In one constructed embodiment, springs 64, 66 exert about 1.5 lbs. of force. Disengagement of teeth 70, 72 is accomplished by energizing actuator 62 using a control signal (not shown) generated by the vehicle operator or a programmable microcontroller (not shown). In one constructed embodiment, the plunger 94 of actuator 62 initially is driven by $12V_{DC}$. This current causes plunger 94 to move approximately 0.220 inches and plunger 94 exerts an initial force of about 10 lbs. at the start and 13.5 lbs. once fully extended. After extension, $3V_{DC}$ is used to maintain plunger 94 in place and a holding force of about 9 lbs is exerted by plunger 94. Extension of plunger 94 causes rotation of lever 58 about shaft 56. Because teeth 70, 72 remained engaged under the torque of axle shaft 40, rotation of lever 58 compresses spring 60 creating a torsional load or spring force of about 7.5 lbs acting against yoke 54 in one constructed embodiment. Upon a reduction in torque in axle shaft 40, spring 60 forces yoke 54 to rotate in a clockwise direction to a position in which teeth 70, 72 become disengaged. One advantage of the present invention is that the compression of spring 60 by the initial rotation of lever 58 in response to plunger 94 creates a secondary force urging yoke 54 away from lever 58 thereby reducing the force required from actuator 62. As yoke 54 pivots, the tension in spring 60 decreases while the tension in return springs 64, 66 increases until the opposing forces are balanced. The use of springs 60 and 64, 66 in the present invention is advantageous because springs 60 and 64, 66 allow independent adjustment of the forces urging yoke 54 in either rotational direction and, consequently, clutch collar 52 in either axial direction. For example, selecting the balance of these spring forces determines the extent to which clutch collar 52 will move axially outboard from case 24 upon disengagement.

Upon deenergization of actuator 62, or a failure in the power source for actuator 62, return springs 64, 66 urge yoke to a position in which teeth 70 of clutch collar 52 and teeth 72 of case 24 become engaged. Movement of yoke 54 also causes corresponding movement of lever 58 through spring 60 thereby urging plunger 94 into a retracted position in actuator 62. In the embodiment shown in FIG. 1, springs 64, 66 urge yoke 54 to rotate in a counterclockwise direction thereby causing collar 52 to move axially in an inboard direction.

A differential in accordance with the present invention represents an improvement over prior art differentials. The inventive differential can operate freely during vehicle travel regardless of the level of engagement between the teeth 70, 72 on the clutch collar 52 and differential case 24. The inventive differential may also eliminate the need for manual operation of the differential locking mechanism through use of an electronically controlled actuator 62. The locking mechanism of the inventive differential is also compact with lever 58 disposed inside the differential housing 12 thereby conserving vehicle space.

While the invention has been particularly shown and described with reference to the preferred embodiment thereof, it is well known by those skilled in the art that various changes and modifications can be made in the invention without departing from the spirit and scope of the invention as defined by the following claims.

We claim:

1. A differential comprising:
    a differential case defining a central bore;
    a drive axle shaft disposed within said central bore and rotatable therein;
    a clutch collar disposed about said drive axle shaft, said clutch collar selectively engaging said differential case to prevent relative rotation between said drive axle shaft and said differential case;
    a spring disposed about a pivot shaft and connected to said clutch collar
    a lever disposed on said pivot shaft
    an electronic actuator that selectively urges said lever in a first rotational direction
    wherein rotation of said lever in said first rotational direction creates a spring force in said spring urging said clutch collar in a first direction either into engagement with said differential case or out of engagement with said differential case.

2. The differential of claim 1 wherein urging said lever in said first rotational direction compresses said spring and said spring causes said clutch collar to engage said differential case.

3. The differential of claim 2 wherein said actuator exerts an initial force on said lever, said initial force followed by a holding force, said holding force being less than said initial force.

4. The differential of claim 1 wherein said actuator comprises a solenoid.

5. The differential of claim 4 wherein said solenoid comprises a push-type solenoid.

6. The differential of claim 4 wherein said solenoid comprises a magnetic latching solenoid.

7. The differential of claim 1 wherein said spring is a double coil spring.

8. The differential of claim 1 wherein said differential case includes a first set of engagement members and said clutch collar includes a second set of engagement members configured to selective engage said first set of engagement members and to prevent relative rotation between said drive axle shaft and said differential case.

9. The differential of claim 1 wherein said first and seconds sets of engagement members comprise first and second sets of teeth.

* * * * *